United States Patent
Zeng et al.

(10) Patent No.: US 8,727,247 B2
(45) Date of Patent: May 20, 2014

(54) METHOD FOR EXTRACTING COPPER FROM CINDERS

(71) Applicants: Daye Nonferrous Metals Co., Ltd., Huangshi (CN); Daye Nonferrous Design and Research Institute Co., Ltd., Huangshi (CN)

(72) Inventors: Xianglong Zeng, Huangshi (CN); Reiqiang Huang, Huangshi (CN); Quande Li, Huangshi (CN); Wei Han, Huangshi (CN)

(73) Assignees: Daye Nonferrous Metals Co., Ltd., Huangshi (CN); Daye Nonferrous Design and Research Institute Co., Ltd., Huangshi (CN)

( * ) Notice: Subject to any disclaimer, the term of this patent is extended or adjusted under 35 U.S.C. 154(b) by 0 days.

(21) Appl. No.: 13/711,597

(22) Filed: Dec. 11, 2012

(65) Prior Publication Data
US 2013/0099030 A1    Apr. 25, 2013

Related U.S. Application Data

(63) Continuation-in-part of application No. PCT/CN2011/079484, filed on Sep. 8, 2011.

(30) Foreign Application Priority Data

Jun. 7, 2011 (CN) .......................... 2011 1 0149853

(51) Int. Cl.
*B02C 25/00* (2006.01)

(52) U.S. Cl.
USPC .......... 241/21; 241/30; 241/24.13; 241/24.14

(58) Field of Classification Search
CPC ....................................................... B02C 23/14
USPC .......... 241/20, 21, 24.1, 24.13, 24.14, 24.25, 241/30

See application file for complete search history.

(56) References Cited

U.S. PATENT DOCUMENTS

| | | | | |
|---|---|---|---|---|
| 1,954,462 A | * | 4/1934 | Tainton | 241/3 |
| 2,075,466 A | * | 3/1937 | Queneau | 75/10.67 |
| 2,302,588 A | * | 11/1942 | Weber | 241/61 |
| 2,373,635 A | * | 4/1945 | Wuensch | 241/20 |
| 3,605,243 A | * | 9/1971 | Oster | 29/403.3 |
| 3,658,260 A | * | 4/1972 | Williams | 241/19 |
| 3,905,556 A | * | 9/1975 | Drage | 241/19 |
| 4,242,129 A | * | 12/1980 | Kellerwessel et al. | 75/727 |
| 5,169,073 A | * | 12/1992 | Marabini et al. | 241/20 |

* cited by examiner

*Primary Examiner* — Faye Francis
*Assistant Examiner* — Leonel Vasquez
(74) *Attorney, Agent, or Firm* — Matthias Scholl P.C.; Matthias Scholl

(57) ABSTRACT

A method for extracting copper, including: 1) inputting a copper cinder into a ball grinder to grind, screening, transferring resulting coarse grains to a first magnetic separator to yield a copper concentrate I and magnetic minerals, and returning the magnetic minerals to the ball grinder; 2) transferring resulting fine grains from the screening to a classifier to yield a deposited sand and an overflowing slurry, returning the deposited sand to the ball grinder, transferring the overflowing slurry to a flotation unit to yield a copper concentrate II and a gangue; 3) transferring the gangue to a second magnetic separator to separate a non-magnetic mineral from a magnetic mineral, transferring the non-magnetic mineral to a gravity concentrator to get a semi-qualified product, and transferring the semi-qualified product to a table concentrator to yield a copper concentration III; 4) discharging the gangue and the magnetic mineral.

3 Claims, 2 Drawing Sheets

METHOD FOR EXTRACTING COPPER FROM CINDERS

CROSS-REFERENCE TO RELATED APPLICATIONS

This application is a continuation-in-part of International Patent Application No. PCT/CN2011/079484 with an international filing date of Sep. 8, 2011, designating the United States, now pending, and further claims priority benefits to Chinese Patent Application No. 201110149853.8 filed Jun. 7, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for non-ferrous metal extraction, and more particularly to a method for extracting copper.

2. Description of the Related Art

Copper cinder is a byproduct from the process of high temperature pyrometallurgy. The main component of copper cinder is Fe existing in the form of ferrosilicate minerals and magnetic iron ore, besides, copper cinder further contains Cu, Pb, Zn, $Al_2O_3$, CaO, $Sio_2$, S, and a small amount of gold and silver. The property of copper cinder is complicated, copper, for example, exists in the form of copper sulfide, metallic copper, and a small amount of copper oxide. The property of copper cinder is determined by the property of copper concentrate input into the smelter, smelting conditions, and the cooling process of the cinder. Furthermore, most of the precious metals coexist with copper, thus, copper as well as the precious metals can be extracted. As an important second metal resource, copper cinder contains many available resources. With the development of benefication technology, dilution-flotation technique used in copper cinder has achieved relatively ideal technical indexes. However, the conventional technology used to separate copper cinder containing more than 8.0 wt. % of copper cannot achieve such ideal technical indexes. Main factors are as follows: 1) in the conventional flotation process, copper cinders containing high level of copper are easy to deposit, thus the floatation of copper particles may be affected; 2) in the process of grinding, because of copper's malleability and large gravity, copper is easy to gather, which may affect the grinding efficiency, and the final particle size of copper may exceed the largest particle size for floatation. Therefore, according to the special property of copper cinder containing high level of copper, it is significant to seek a method with high efficiency and low consumption.

SUMMARY OF THE INVENTION

To solve the problem that the conventional dilution-flotation technique is not applicable to the extraction of the copper cinder containing high level of copper, easily causes serious copper loss, and has a low extraction rate, this invention provides a method for extracting copper from copper cinders containing high level of copper.

To achieve the above objective, in accordance with one embodiment of the invention, there is provided a method for extracting copper is as follows:

1) inputting a copper cinder into a ball grinder to grind, screening in a high-frequency shale shaker, transferring resulting coarse grains to a first magnetic separator for a first magnetic separation to yield a copper concentrate I and magnetic minerals, and returning the magnetic minerals to the ball grinder;
2) transferring resulting fine grains from the screening to a classifier to yield a deposited sand and an overflowing slurry, returning the deposited sand to the ball grinder, transferring the overflowing slurry to a flotation unit to yield a copper concentrate II and a gangue;
3) transferring the gangue to a second magnetic separator for a second magnetic separation to separate a non-magnetic mineral from a magnetic mineral, transferring the non-magnetic mineral to a gravity concentrator to get a semi-qualified product, and transferring the semi-qualified product to a table concentrator to separate a copper concentration III from an unqualified product; and
4) returning the unqualified product to the gravity concentrator, and discharging the unqualified product and the magnetic mineral from the second magnetic separator.

In a class of this embodiment, the first magnetic separator is a dehydrating magnetic separator, the second magnetic separator is a conventional magnetic separator; the magnetic field strength of the first magnetic separator is controlled between 1200 and 1600 Oe, and the magnetic field strength of the second magnetic separator is controlled between 1600 and 2500 Oe.

In a class of this embodiment, the gravity concentrator employs a centrifuge or a spiral chute.

Advantages of the invention are summarized below: a process of screening and magnetic separation is introduced in the invention to exctract the coarse bare copper as early as possible. In the meanwhile, bare copper with large gravity but difficult to grind can be separated by the magnetic separator in advance, in case of large amount of bare copper being conveyed to the flotation unit and a much higher level of copper content in final gangue. This invention employs magnetic separation, gravity separation and other process after flotation, by which fine copper concentrate and copper minerals can be further extracted, thus to realize high extraction efficiency. This invention employs an integrated process including gravity separation, magnetic separation, flotation and gravity separation, and table concentration to fully extract copper minerals, results of extracting copper cinder containing 8.5 wt. % of copper using the method of the invention, show that the copper content of the output gangue can be reduced to lower than 0.35 wt. %, whereas the copper content of the output gangue of the conventional method is higher than 0.7 wt. %, thus the extraction rate of the invention can reach an ideal technical index of 97 wt. %.

DETAILED DESCRIPTION OF THE EMBODIMENTS

For further illustrating the invention, experiments detailing a method for extracting copper are described below. It should be noted that the following examples are intended to describe and not to limit the invention.

Figure 1:
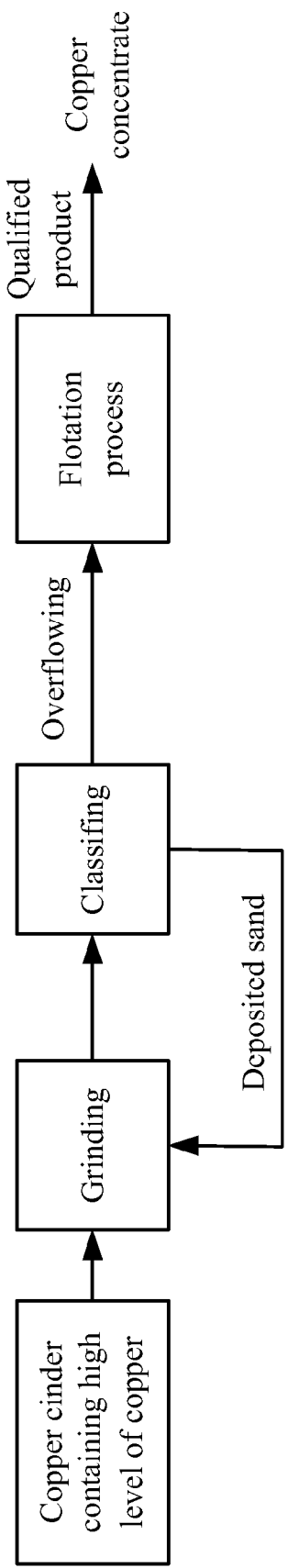
FIG. 1 is a process flow diagram of a conventional method for extracting copper.
Figure 2:
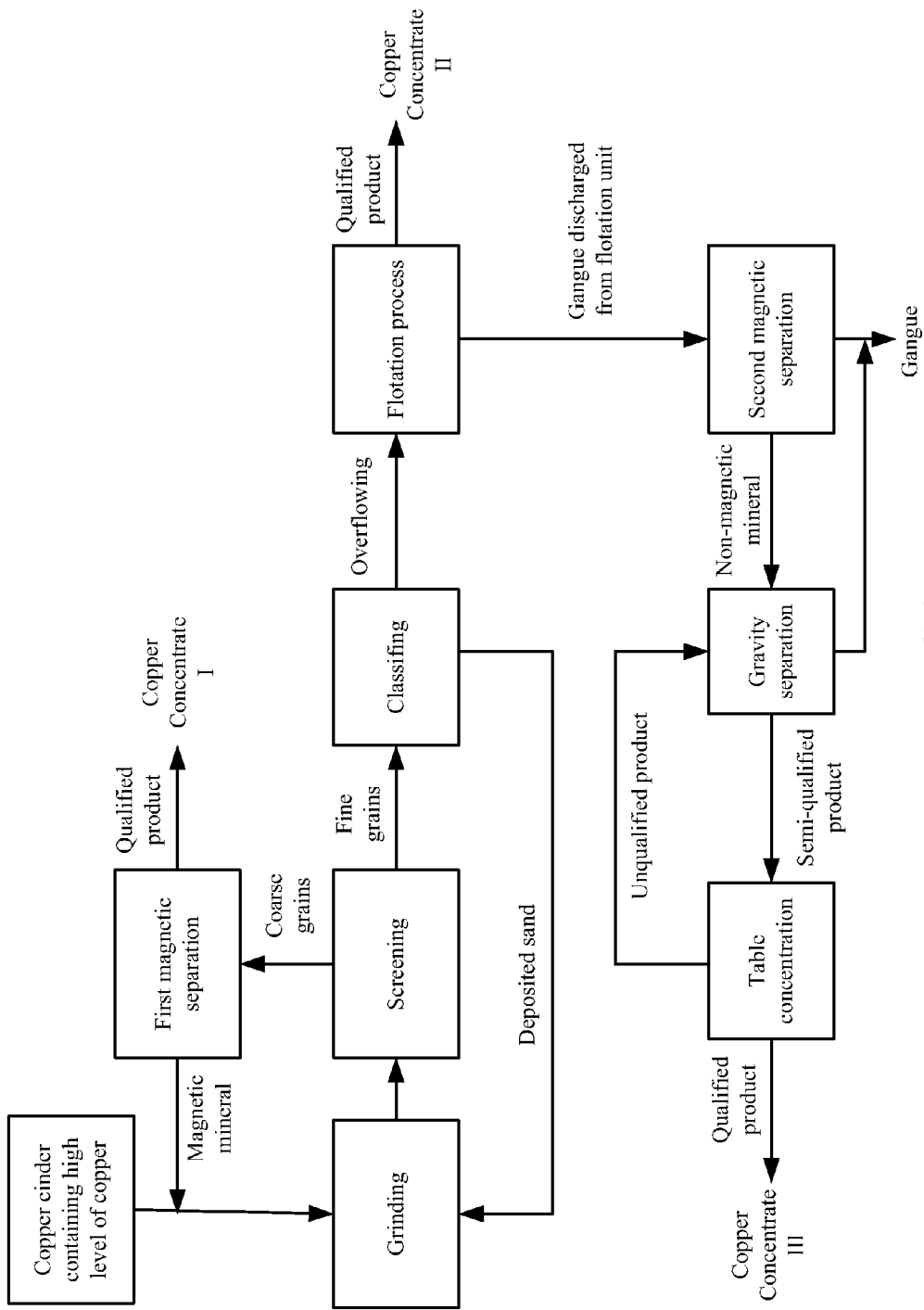
FIG. 2 is a process flow diagram of a method for extracting copper in accordance with one embodiment of the invention.

As shown is FIG. 2, a method of copper extraction of this invention is described as follows.

(1) A copper cinder containing high level of copper is input into a ball grinder to grind, the technology of grinding and separation adopts stage-grinding and stage-concentration; (2) between the process of grinding and classify, a shale shaker is provided to separate coarse grains (diameter≥0.2-1.0 mm) from fine grains, the coarse grains are transferred to a first magnetic separator (dehydrating magnetic separator) for a first magnetic separation (magnetic field strength is between 1200 and 1600 Oe), to separate non-magnetic minerals, namely coarse copper concentrate I, from magnetic minerals; the magnetic minerals from the magnetic separation are returned to the ball grinder. Fine grains from the shale shaker are transferred to a classifier to yield deposited sand which is then returned to the ball grinder, and an overflowing slurry which is then transferred to a flotation unit; (3) the flotation process is basically the same as the conventional. Particles (with a diameter of −0.074 mm) obtained from the first stage is between 70 and 78 wt. %, particles (with a diameter of −0.043 mm) obtained from the second stage is between 85 and 90 wt. %, and the flotation concentrates are copper concentrate II; (4) the gangue from the flotation is transferred to a second magnetic separator (conventional magnetic separator) for a second magnetic separation (magnetic field strength is between 1600 and 2500 Oe) to separate a non-magnetic mineral from a magnetic mineral, the non-magnetic mineral is conveyed to a gravity concentrator (centrifuge or spiral chute) to get a semi-qualified product which is further concentrated with a table concentrator to yield a copper concentration III. An unqualified product from the table concentrator is returned to the centrifuge or spiral chute, an unqualified product from the centrifuge or spiral chute, and a magnetic mineral from the second magnetic separator are discharged as a final gangue.

Technical indexes of this embodiment are as follows:

Copper content of the input copper cinder is 9.2 wt. %;

Copper concentrate I: copper content is 38.5 wt. %, and extraction rate is 38.46 wt. %;

Copper concentrate II: copper content is 27.6 wt. %, and extraction rate is 54.51 wt. %;

Copper concentrate III: copper content is 16.4 wt. %, and extraction rate is 4.33 wt. %;

Final gangue: copper content is 0.33 wt. %, and extraction rate is 2.70 wt. %;

Total copper concentrate: copper content is 30.05 wt. %, and extraction rate is 97.30 wt. %.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for extracting copper, comprising:
   a) inputting a copper cinder into a ball grinder to grind, screening in a high-frequency shale shaker, transferring resulting coarse grains to a first magnetic separator for a first magnetic separation to yield a copper concentrate I and magnetic minerals, and returning the magnetic minerals to the ball grinder;
   b) transferring resulting fine grains from the screening to a classifier to yield a deposited sand and an overflowing slurry, returning the deposited sand to the ball grinder, transferring the overflowing slurry to a flotation unit to yield a copper concentrate II and a gangue;
   c) transferring the gangue to a second magnetic separator for a second magnetic separation to separate a non-magnetic mineral from a magnetic mineral, transferring the non-magnetic mineral to a gravity concentrator to get a semi-qualified product, and transferring the semi-qualified product to a table concentrator to separate a copper concentration III from an unqualified product; and
   d) returning the unqualified product to the gravity concentrator, and discharging the unqualified product and the magnetic mineral from the second magnetic separator.

2. The method of claim 1, wherein the first magnetic separator is a dehydrating magnetic separator, and the second magnetic separator is a conventional magnetic separator; a magnetic field strength of the first magnetic separator is controlled between 1200 and 1600 Oe, and a magnetic field strength of the second magnetic separator is controlled between 1600 and 2500 Oe.

3. The method of claim 1, wherein the gravity concentrator employs a centrifuge or a spiral chute.

* * * * *